United States Patent [19]

Rebours et al.

[11] 3,884,657

[45] May 20, 1975

[54] FILTERING DEVICES WITH AT LEAST ONE FILTERING CAVITY

[75] Inventors: Albert Rebours, Chatou; Christian Carré, Houilles, both of France

[73] Assignee: Air-Industrie, Courbevoie, France

[22] Filed: July 20, 1973

[21] Appl. No.: 381,001

[30] Foreign Application Priority Data
July 28, 1972    France .............................. 72.27274

[52] U.S. Cl. ..................... 55/293; 55/302; 55/374; 55/456; 55/457; 55/464; 55/505; 55/DIG. 12
[51] Int. Cl. ............................................ B01d 46/04
[58] Field of Search ............. 55/302, 341, 378, 381, 55/457, 303, 293, 456, 464, 505, 374, 376, DIG. 12

[56] References Cited
UNITED STATES PATENTS

| | | | |
|---|---|---|---|
| 2,010,898 | 8/1935 | Ruemelin | 55/341 X |
| 2,775,348 | 12/1956 | Williams | 55/302 X |
| 2,853,154 | 9/1958 | Rivers | 55/378 X |
| 3,177,636 | 4/1965 | Jensen | 55/341 |
| 3,289,393 | 12/1966 | Spotta | 55/302 |
| 3,421,295 | 1/1969 | Swift et al. | 55/341 X |
| 3,431,709 | 3/1969 | Kawanami | 55/341 X |
| 3,479,802 | 11/1969 | Fesco | 55/381 X |
| 3,509,698 | 5/1970 | Medcalf et al. | 55/302 |
| 3,517,821 | 6/1970 | Monson et al. | 55/457 X |
| 3,524,304 | 8/1970 | Wittemeier et al. | 55/341 X |
| 3,594,992 | 7/1971 | Carr et al. | 55/302 |
| 3,616,621 | 11/1971 | Fesco | 55/378 X |
| 3,693,329 | 9/1972 | Willis | 55/457 |
| 3,765,152 | 10/1973 | Pausch | 55/302 X |
| 3,793,812 | 2/1974 | Willis | 55/457 X |

FOREIGN PATENTS OR APPLICATIONS 740,842   11/1955   United Kingdom.................. 55/302

*Primary Examiner*—Frank W. Lutter
*Assistant Examiner*—Kathleen J. Prunner
*Attorney, Agent, or Firm*—Larson, Taylor & Hinds

[57] ABSTRACT

The filtering cavity has a filtering wall and is arranged in an inlet enclosure and communicates with an outlet enclosure separated from said inlet enclosure by a separating partition. The gas to be filtered passes through the wall of the filtering cavity from outside to inside. Means for introducing a clearing gas into this cavity are provided comprising at least one connecting pipe connecting the cavity to the outlet enclosure by passing through the separating partition and at least one injection nozzle opening opposite the open end of this connecting pipe. A fixed blade or like device is provided in this connecting pipe, said fixed blades being arranged so as to rotate the flow of clearing gas delivered by said injection nozzle.

7 Claims, 5 Drawing Figures

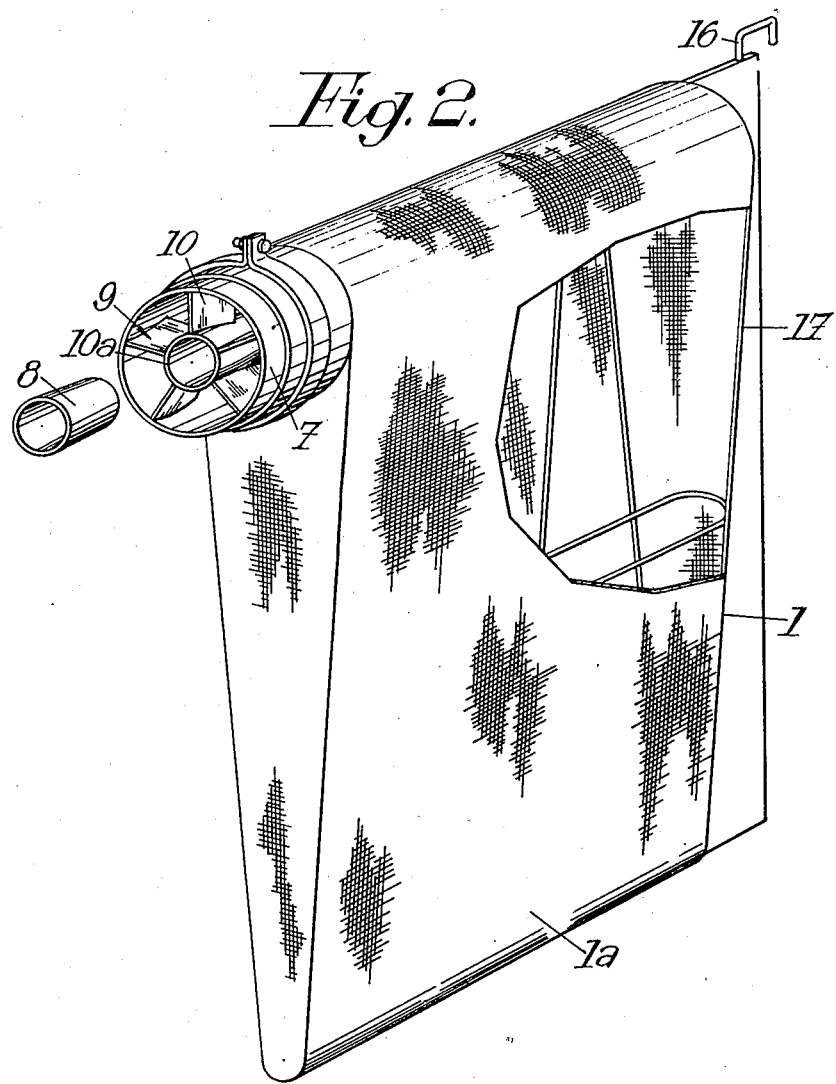
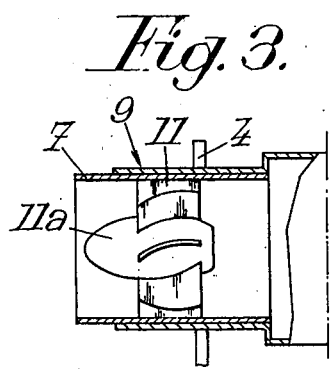
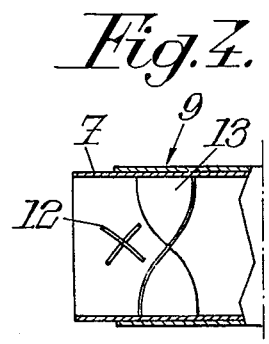

FILTERING DEVICES WITH AT LEAST ONE FILTERING CAVITY

The invention relates to filtering devices with at least one filtering cavity (that is to say a cavity having a filtering wall), in the shape of a pocket or sleeve, arranged in an inlet enclosure and communicating with an outlet enclosure separated from said inlet enclosure by a separating partition, a gas to be filtered passing through the wall of this filtering cavity from the outside to the inside, such that the particles retained are deposited on the outer surface of the filtering wall of the cavity.

In such filtering devices, it is necessary to undertake clearing of the cavity wall, and to do this it has already been proposed to introduce into this cavity a clearing gas to produce a slight swelling of the wall of the cavity and a temporary counter flow which causes the dropping of the retained particles.

It is an object of the invention to improve filtering devices of this type, as regards the simplicity and efficiency of the means brought into play for causing the pneumatic clearing of the one or more filtering cavities.

A filtering device in accordance with the invention comprises at least one filtering cavity contained within an inlet enclosure and includes means for introducing a gas to be filtered into the inlet enclosure so as to be exposed to the external sides of the filtering cavity. An outlet enclosure is separated from the inlet enclosure by a separating partition. A connects pipe connecting the cavity interior to the outlet enclosure by passing through the separating partition. Exhausting means are provided for evacuating filtered gas out of the outlet enclosure, which filtered gas has passed through the cavity from the exterior thereof to the interior. Gas injection means, such as an injection nozzle, is arranged in the outlet enclosure opposite the open end of the connecting pipe in the outlet enclosure for introducing from time to time and during relatively short periods a flow of clearing gas under pressure into the filtering cavity, in counterflow with respect to the normal issuing flow of the filtered gas out of the cavity, this injection means being connected to a supply of compressed clearing gas, through controllable valve means. The connecting pipe is internally provided with fixed helicoid blade means for effecting rotation of the flow of clearing gas delivered by the injection means while the flow penetrates into the filtering cavity.

It will then be understood that this flow of clearing gas causes a complete filling of the connecting pipe, thus interrupting the flow of filtered gas which emerges from the cavity through this connecting pipe, hence ensures swelling of the wall of the cavity and efficient clearing over its whole outer surface.

The invention consists, apart from this main feature, of certain other features which are preferably used at the same time and which will be more explicitly considered below.

The invention will, in any case, be well understood with the aid of the supplementary description which follows as well as the accompanying drawings, which supplementary description and drawings relate to embodiments of the invention and do not of course have any limiting character.

FIG. 1 of these drawings, is a perspective view, with parts removed, of one embodiment of a filtering device constructed according to the invention, the filtering cavities being in the form of pockets.

FIG. 2 is a perspective view, on a larger scale and with parts cut away, showing a filtering pocket of the embodiment of FIG. 1.

FIGS. 3 and 4, show two partial sections of the connecting pipe for two other embodiments of a filtering device according to the invention.

Figure 1:
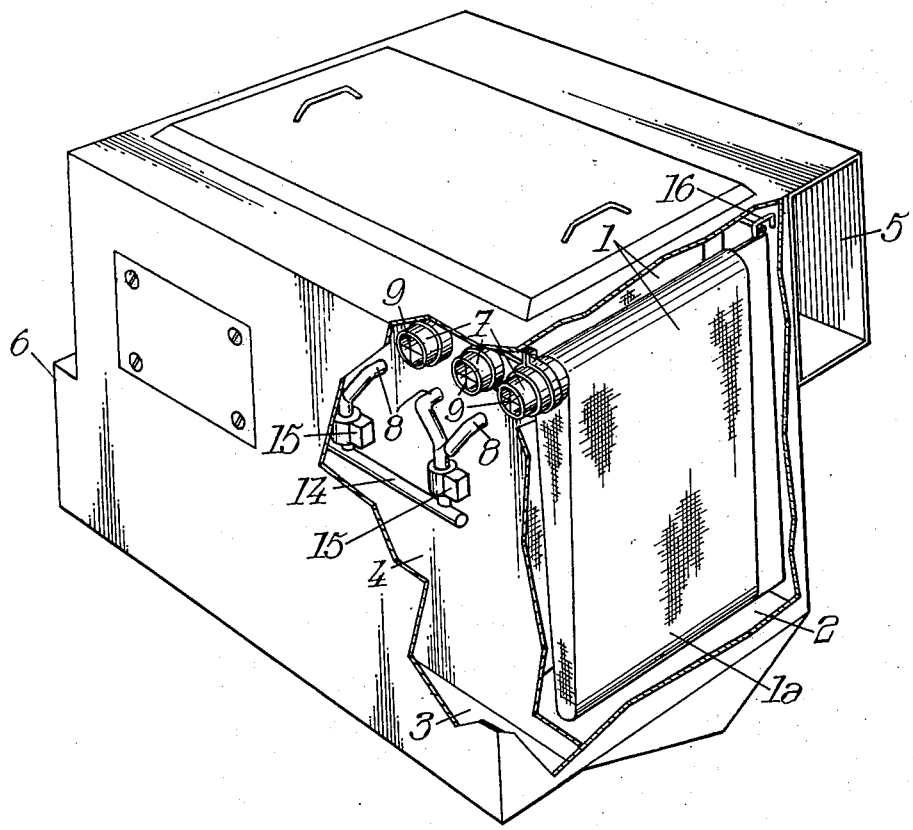

The device shown in FIG. 1 comprises a plurality of filtering cavities 1, in the form of pockets, arranged in an inlet enclosure 2 and communicating with an outlet enclosure 3 which is separated from said inlet enclosure 2 by a separating partition 4.

The gas to be filtered is introduced into the inlet enclosure 2 through an inlet pipe 5, and the filtered gas is extracted from the outlet enclosure 3 through an outlet pipe 6.

The gas to be filtered passes through each pocket 1 from outside to inside, that is to say that the particles filtered or retained are deposited on the outer surface of the surface 1a of each pocket 1.

Means are then provided to introduce a clearing gas into each pocket 1, in order to create a slight swelling of said pocket and a temporary counter flow which causes the fall of the retained particles.

According to the invention these means comprise, for each pocket 1, an open ended connecting pipe 7 connecting the pocket 1 to the outlet enclosure 3 but passing through the separating partition 4, and an injection nozzle 8 located in the outlet enclosure opening opposite the open end of this connecting pipe 7.

A fixed blade or like device 9 is then arranged in this connecting pipe 7, said fixed blades being arranged so as to rotate the flow of gas delivered by the injection nozzle 8.

As shown in FIG. 2, this blade or like device 9 comprises a fixed helix 10 of which the hub 10a is hollow; such a device enables the direct passage of the central portion of the flow of gas delivered through the injection nozzle 8.

As shown in FIG. 3, this blade or like device 9 comprises a fixed helix 11 of which the hub 11a is solid and has a streamlined shape; under these conditions, the whole of the flow of gas delivered through the injection nozzle 8 is rotated by this helix 11.

As shown in FIG. 4, this blade or like device 9 comprises two fixed helixes 12 and 13 situated in different planes and angularly offset from each other inside of the connecting pipe 7 and each comprising, for example, two blades; advantageously, these two helixes 12 and 13 can be constituted respectively by two pieces of cut-out and twisted sheet metal.

As regards the clearing gas, it is advantageous to have recourse to air under pressure which is distributed through the various injection nozzles 8 through a pipe 14 and electrovalves 15.

The support of the pocket 1 can then be ensured, on the side of the separating partition 4, by the connecting pipe 7, and, on the opposite side, by a hook support 16 rigidly fixed to an element belonging to an inner frame element 17 ensuring the shaping of the pocket 1.

On the opposite side relative to the connecting pipe 7, this pocket 1 can have an initially open portion, intended to permit the introduction of the inner frame 17, this open portion then being closed in any convenient manner.

Figure 5:
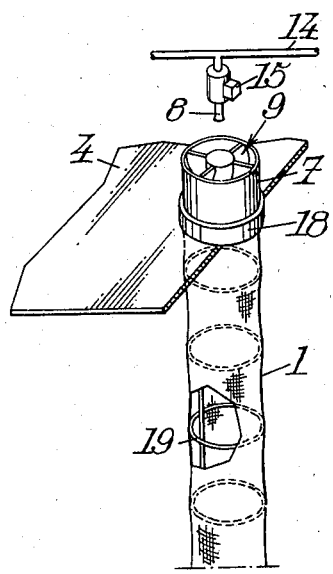
FIG. 5 is a perspective view with parts cut away showing a filtering sleeve of yet another embodiment of a filtering device according to the invention.

However, according to a modification of the invention, the filtering device could comprise a plurality of filtering cavities 1 in the form of sleeves; this embodiment is illustrated in FIG. 5, in which the same reference numerals denote the same members as in FIGS. 1 and 2.

The sleeve 1 is advantageously fixed on the connecting pipe 7 by a collar 18.

Preferably, the sleeve 1 is arranged vertically and it comprises an inner frame 19, comprising annular elements, which is intended to ensure the shaping of the sleeve 1.

In any event, and whatever the embodiment, the filtering device according to the invention comprises pneumatic clearing means which are particularly simple and efficient.

In fact, the production of filtering cavities equipped with a connecting pipe poses practically no constructional problem, and moreover this connecting pipe is used to advantage to support one of the ends of the cavity.

As for the fixed blade or paddle device arranged in the connecting pipe, it can be simply constructed as indicated above.

Finally, the flow of clearing gas delivered by the injection nozzle causes a complete filling of the connecting pipe and thus interrupts the flow of filtered gas which emerges from the cavity through this connecting pipe, hence ensures swelling of the cavity and efficient clearing over its whole outer surface.

We claim:

1. In a filtering device, the combination comprising: at least one filtering cavity in the form of a hollow member of filter material; means defining an inlet enclosure containing said filtering cavity; means for introducing a gas to be filtered into said inlet enclosure so as to be exposed to the external sides of said filtering cavity; an outlet enclosure separated from said inlet enclosure by a separating partition; an open ended connecting pipe connecting the cavity interior to the oulet enclosure by passing through the separating partition; exhausting means for evacuating filtered gas out of said outlet enclosure, said filtered gas having passed through the cavity from the exterior thereof to the interior thereof; and gas injection means, including an injection nozzle, arranged in said outlet enclosure opposite the open end of the connecting pipe in the outlet enclosure for introducing from time to time and during relatively short periods a flow of clearing gas under pressure into said filtering cavity, in counter flow with respect to the normal issuing flow of the filtered gas out of the cavity; and means connecting said injection means to a supply of compressed clearing gas, through controllable valve means; said connecting pipe being internally provided with fixed helicoid blade means for effecting rotation of the flow of clearing gas delivered by said injection means as said clearing gas passes into said filtering cavity.

2. Filtering device according to claim 1 wherein said fixed blade means comprises a fixed helix having a hollow central hub, the blades of said blade means extending between said hollow hub and the wall of said connecting pipe.

3. Filtering device according to claim 1 wherein said fixed blade means comprises a fixed helix having a solid hub of streamlined shape, the blades of said blade means extending between said hub and the wall of said connecting pipe.

4. Filtering device according to claim 1 wherein the fixed blade means comprises two fixed helix members situated in different planes inside the connecting pipe.

5. Filtering device according to claim 4 wherein the two helixes are respectively constituted by two cut-out and twisted sheets of metal.

6. Filtering device according to claim 1 wherein the filtering cavity has the form of a sleeve.

7. Filtering device according to claim 1 wherein said filtering cavity comprises a rigid interior frame covered by filtering material.

* * * * *